United States Patent
Glass et al.

(10) Patent No.: US 7,436,300 B2
(45) Date of Patent: Oct. 14, 2008

(54) WIRELESS DEVICE SUPPORT FOR ELECTRONIC DEVICES

(75) Inventors: Andrew C Glass, Woodinville, WA (US); Bernard J Thompson, Bellevue, WA (US); Bradley L Fosdick, Kirkland, WA (US); Chih Jen Wen, Redmond, WA (US); Christopher M Dreher, Seattle, WA (US); Doron J Holan, Seattle, WA (US); Firdosh K Bhesania, Kirkland, WA (US); Gary M Rensberger, Redmond, WA (US); Peter E. H. Hauser, Kirkland, WA (US); Randall E Aull, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 10/987,980

(22) Filed: Nov. 12, 2004

(65) Prior Publication Data

US 2006/0105712 A1    May 18, 2006

(51) Int. Cl.
*G08B 13/14* (2006.01)
*H04B 5/00* (2006.01)
*H04M 3/00* (2006.01)

(52) U.S. Cl. .................. 340/568.1; 455/41.1; 455/418; 455/412.1; 370/310; 370/313

(58) Field of Classification Search .............. 340/568.1; 455/41.1–41.5, 418, 412.1, 410–411, 420, 455/466, 88, 86; 370/310, 313, 257

See application file for complete search history.

(56) References Cited

U.S. PATENT DOCUMENTS

| 7,054,616 | B2 * | 5/2006 | Rickhoff et al. | 455/411 |
| 7,130,584 | B2 * | 10/2006 | Hirvonen | 455/41.2 |
| 7,155,163 | B2 * | 12/2006 | Cannon et al. | 455/41.2 |
| 7,174,130 | B2 * | 2/2007 | Kurisko et al. | 455/41.2 |
| 7,215,649 | B2 * | 5/2007 | Yu et al. | 370/313 |
| 2006/0068760 | A1 * | 3/2006 | Hameed et al. | 455/412.1 |

* cited by examiner

Primary Examiner—Brian Zimmerman
Assistant Examiner—Nam V Nguyen
(74) Attorney, Agent, or Firm—Amin, Turocy & Calvin, LLP (57) ABSTRACT

Disclosed are a unique system and method that facilitate establishing and maintaining a secure connection between at least one wireless input component and a host (e.g., PC). The system and method involve the wireless input component broadcasting a message that can be "heard" by any potential host located within a given distance from the wireless input component. The message can indicate that the input component is available for use or pairing with a PC. PCs in the area can respond to the message by notifying the user that a wireless input component is available and by generating a random PIN. The PIN can be displayed to the user on the respective PC. The user can be prompted to enter the PIN using the wireless device. When a match between the user's response and the corresponding PC is determined, the two can be securely linked. In addition the invention provides support of wireless input devices at boot or start up.

29 Claims, 9 Drawing Sheets

WIRELESS DEVICE SUPPORT FOR ELECTRONIC DEVICES

TECHNICAL FIELD

The subject invention relates in general to the support of wireless input devices and in particular to authenticating and maintaining secure connections between a wireless human interface device (HID) and the respective host.

BACKGROUND OF THE INVENTION

Bluetooth wireless input devices provide a number of advantages for the end user over similar devices implementing other wireless technologies, including reliability and enhanced security.

In general, Bluetooth is a term used to described the protocol of a short range (e.g., about 10 meters) frequency-hopping radio link between devices to allow wireless connections between the devices. Bluetooth employs Gaussian frequency shift keying to modulate the data to frequencies around 2.4 GHz and is capable of point-to-point or point-to-multipoint communication. This flexibility allows the wireless technology of Bluetooth to penetrate the market in a variety of applications such as heart rate monitors, PDAs (personal digital assistants), and human interface devices (HIDs). The interest in HIDs in particular, such as keyboards and other input devices has expanded as consumers continue to demand improved wireless capabilities when computing at home, at the office or on the go. For this reason, it is expected that this segment of the HID market will grow substantially in the coming years.

The Bluetooth SIG (special interest group) has ratified the Bluetooth HID profile which describes the basic requirements and protocol for HIDs using Bluetooth as the physical layer transport. While the current specification has proven to be well-written in the topics that it covers, some topics were not and have not been directly addressed.

For example, first, it was assumed that the PC BIOS manufacturers would eventually provide native Bluetooth wireless support in the BIOS. Unfortunately, this can be problematic due to the size and complexity of the code needed to handle this. Second, maintaining secure connections remains troublesome under conventional practices. Furthermore, Bluetooth support in the BIOS would require the sharing of security keys between the operating system and the BIOS, which raises additional security risks. In the first generation of Bluetooth supported-devices, security concerns were handled in various ways by various manufacturers, but all have their deficiencies.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention relates to a system and/or methodology that facilitates obtaining and maintaining secure wireless connections between a host (e.g., PC, PDA, smartphone, or any other electronic device) and at least one wireless input device (e.g., human interface device or HID) at startup or any time thereafter. Current Bluetooth support for keyboards, for example, face a number of challenges, including how to support a Bluetooth keyboard or any other HID at boot and how to create a secure connection with a wireless or Bluetooth enabled device (e.g., keyboard) without using another device (e.g., keyboard). This invention addresses these challenges by employing different approaches for each. It should be appreciated that there are different types of wireless technologies including Bluetooth that experience these kinds of challenges. Though Bluetooth is used throughout the discussion of the invention, it is intended as a mere example of one type of wireless technology to which the invention can be applied.

According to one aspect of the subject invention, the systems and methods provide Bluetooth wireless support of an input device at boot. This can be accomplished in part by configuring a local Bluetooth transceiver as a USB (universal serial bus) hub having USB HID emulation before the operating system is loaded. For example, the Bluetooth transceiver can be configured after a USB reset as a standard two or three port hub. Additional ports are possible as well. At least a USB HID keyboard logical device and a USB Bluetooth transceiver logical device can be connected to the logical ports of the hub. This configuration allows the BIOS to detect the HIDs and to use the native USB HID support currently available to support the Bluetooth wireless keyboard and/or any other Bluetooth enabled input device connected thereto.

According to another aspect of the subject invention, a secure connection can be created between a Bluetooth enabled input device and a host (e.g., any electronic device such as a PC) without employing a separate input device to establish the connection. For instance, a Bluetooth keyboard can be securely connected to a host PC without using another keyboard to facilitate the connection. This can be accomplished in part by a unique pairing process between any host PC and the Bluetooth (wireless) input device.

The pairing process involves a carefully orchestrated communication sequence between the wireless input device, such as a keyboard, and the desired PC. In particular, a data input interface (e.g., button, key, knob, and/or control) located on the wireless input device can be invoked by a user to initiate discovery of and pairing to a particular host. When invoked, the data input interface can instruct the input device to send out a signal within an area proximal (or less than full range such as within 1 or 2 meters) to the input device. Potential host PCs located in this area can respond in part by notifying the user that a wireless device is interested in attaching to the PC. For example, a potential host PC can generate a unique character string (e.g., password, passkey, or PIN) and then can present a dialog box requesting the user to enter the displayed character string via the wireless input device. The entered string can then be stored in the wireless input device. When the user's entered password is determined to match the PC-generated password by employing a secure challenge-response technique, then a secure link between the wireless keyboard and the desired host PC can be established. Other PCs may be in the same area or range of the device to detect the signal, but the data (e.g., password) entered on the input device will not match their unique PC-generated password. When any other PCs receive no response to their requests after a time period or an incorrect response, they will dismiss the request.

In yet another aspect, the invention can also mitigate any undesirable consequences of an accidental or unintentional disconnection of a PC bonded to a Bluetooth input device. Unlike conventional techniques, the subject invention maintains the input device's knowledge of the connection by allowing a device to preserve the shared key. For example, if a Bluetooth keyboard has been unintentionally or accidentally "reset" or "removed" from the PC, the user can attempt to re-establish the connection by pressing the appropriate date input button to start the synchronization process again. The user may be asked to enter the PC-generated password. When entered correctly, the connection between the wireless device and the host PC can be re-established. This may also be applicable to situations when communication is somehow lost between the device and the PC and the device stops functioning.

According to another aspect of the invention, the systems and methods can facilitate making a distinction between an intentional and an unintentional "reset" or device removal. In particular, the data interface on such wireless input devices can be configured to erase an input device's shared key when invoked or depressed for a period of time. When the period of time exceeds a threshold, then the depression can indicate an instruction to erase the shared key. At this time, the host address can or should be deleted as well.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with detecting and/or pairing with at least one wireless HID such as a keyboard, mouse, stylus, helmet, joystick, display, thermostat, and/or any other remote control device that can provide input or data to a PC. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For purposes of brevity and ease of understanding, the subject invention is discussed below in connection with Bluetooth technology. However, it should be appreciated that the invention can be readily applied to other technologies involving proximity detection and establishing secure wireless connections with a variety of host electronic and/or computing devices; and such are contemplated to fall within the scope of the invention.

In general, wireless device connections present a rather unique challenge because, unlike (hard) wired devices, a natural event such as plugging in a device to trigger a host (e.g., PC) to recognize the device does not occur. This challenge is particularly noticeable during boot. Recall that traditionally, native Bluetooth support is not resident in the BIOS code of current PCs. Thus, Bluetooth keyboards and other input devices cannot be used natively until such time that an operating system that supports the Bluetooth HID profile has been loaded; and the Bluetooth stack has initialized the local Bluetooth transceiver. However, as will be described below, special measures can be taken to recognize wireless input devices during boot as well as at any other time without requiring additional hard-wired instruments such as keyboards.

Figure 1:
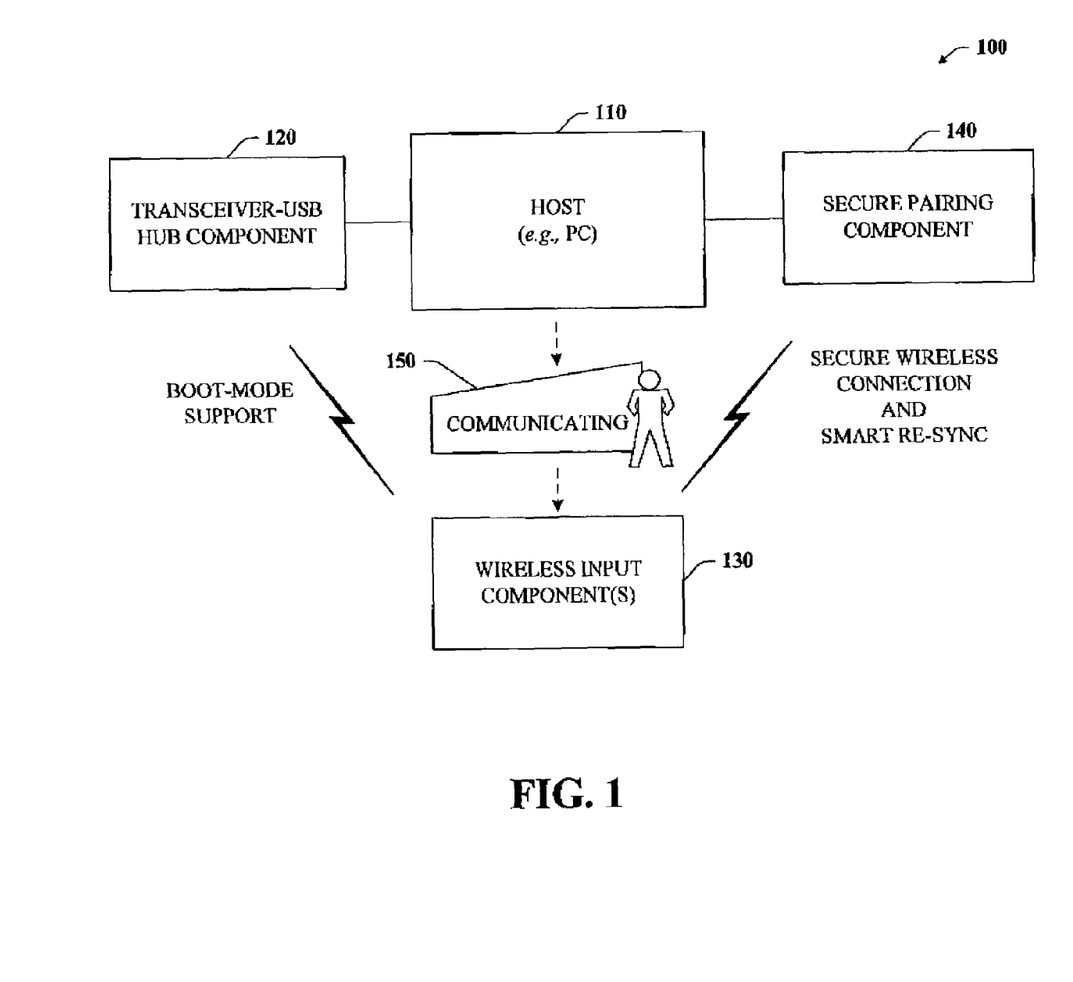
FIG. 1 is a high level block diagram of a computing environment or system that is supportive of Bluetooth enabled wireless devices at boot and/or that can be securely paired therewith in accordance with an aspect of the invention.

Referring now to FIG. 1, there is a general block diagram of a computing system 100 that facilitates recognizing Bluetooth enabled wireless input devices at start up and obtaining and maintaining secure wireless connections between such input devices and processing devices (e.g., PC, PDA, laptop, smartphone, etc.) in accordance with an aspect of the subject invention. The system 100 includes a host PC 110 (e.g., or any host including PC, PDA, or other electronic or computing devices are within the scope) that is operatively connected to a (local) transceiver 120. The local transceiver 120 can be a Bluetooth transceiver that is configured as a USB hub ("transceiver-USB hub"). This configured USB hub should have USB HID emulation to allow BIOS code to seamlessly interact with and detect USB HIDs. By employing this type of configuration, native USB HID support can be used to support the Bluetooth wireless input components 130 (e.g, keyboard, mouse, etc.).

Also operatively connected to the host PC 110 is a secure pairing component 140. The secure pairing component performs a pairing process to establish and maintain secure wireless connections between one or more wireless input components 130 and the host PC 110. More specifically, the secure pairing component can synchronize the host PC 110 to any desirable input components 130 without the aid or assistance of another device such as a keyboard. Pairing new wireless devices to the host PC 110 has been troublesome at best in the past because the issue of initiating communication with a wireless keyboard, for example, without being able to use the keyboard to identify the user has constantly been present and left unresolved. The subject invention allows the host PC 110 and any wireless input components 130 located within a target area or distance from one another to communicate and negotiate invisibly to the user. Thus, the user's security and/or privacy is ultimately maintained because the PC 110 is not exposed until the user initiates an action, depicted as a manual communicating operation 150, based on his desire to use the input component 130.

Figure 2:
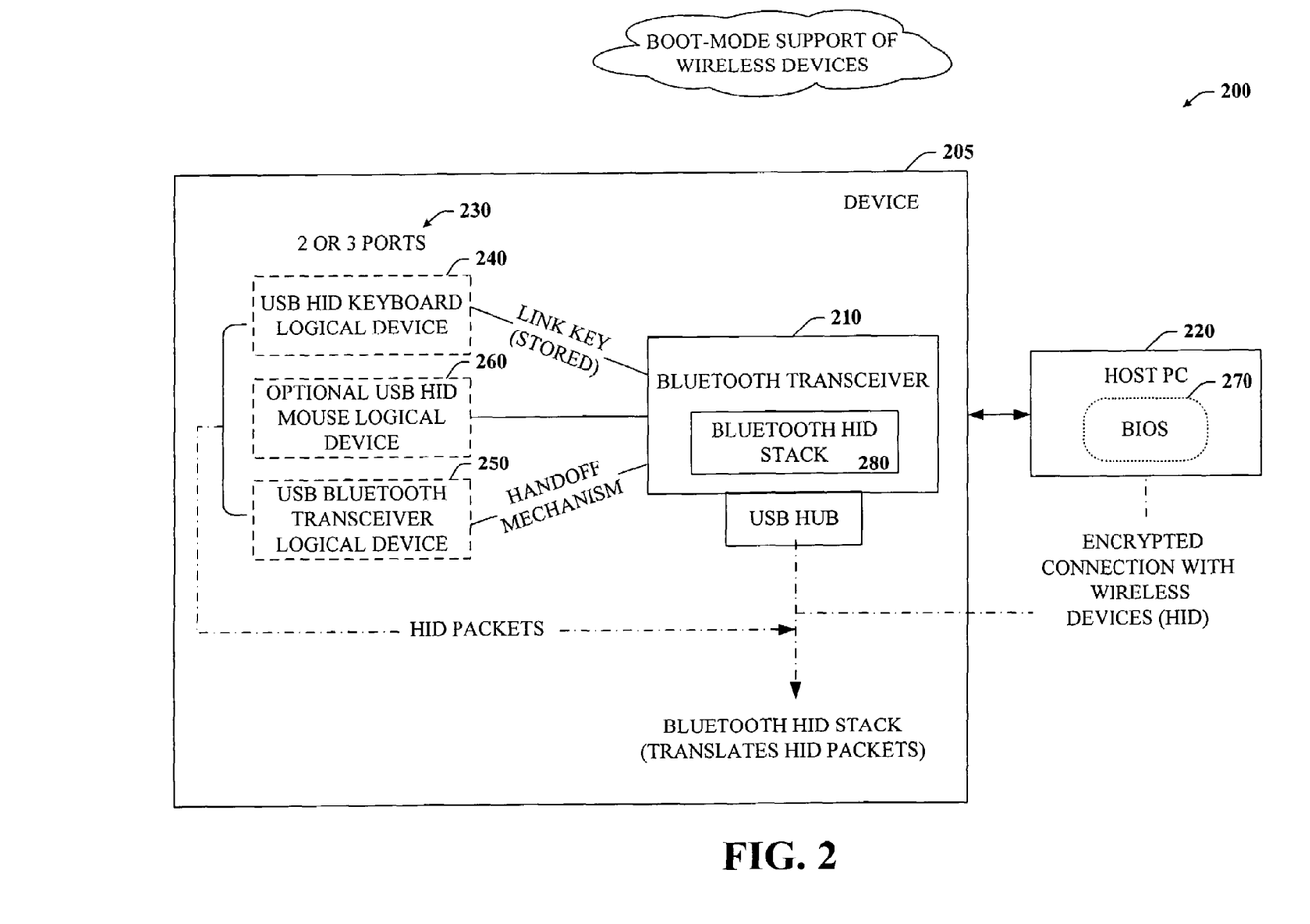
FIG. 2 is a block diagram of a computing environment that supports Bluetooth enabled wireless devices at the operating system level at boot in accordance with an aspect of the subject invention.

Referring now to FIG. 2, there is illustrated a schematic block diagram of a system configuration 200 that facilitates boot-mode support of wireless devices (Bluetooth) in accordance with an aspect of the present invention. The system configuration 200 includes a device 205 locally coupled to a host PC 220. The device 205 includes a Bluetooth transceiver 210, a USB hub, and emulated HID devices. The device 205 can be configured as a USB hub before loading an operating system (not shown).

After a USB reset, the USB hub logical ports can include a connection to a USB HID keyboard logical device 240 and a USB Bluetooth transceiver logical device 250. An optional third port can connect a USB HID mouse logical device 260 when mice are supported by the BIOS 270. Furthermore, the ports should be marked as unremovable by setting a DeviceRemovable bit corresponding to the desired port bit in the hub descriptor to "1". By setting the DeviceRemovable bit, the USB logical ports can identify to the host PC 220 that the logical devices are embedded in the device 205 rather than being true devices attached to exposed ports. It should be appreciated that the DeviceRemovable bit only refers to "user-removable"—not logically removable.

As depicted in the figure, a Bluetooth HID stack 280 can be embedded within the device 205 to allow the transceiver 210 to communicate with the Bluetooth devices and to translate the HID packets from the Bluetooth protocol to the USB protocol and vice versa. It should be appreciated that full Bluetooth stack functionality is not necessary; it is sufficient to enable the minimum necessary operations to support this usage.

It should also be understood that the logical devices should exist at the time the USB bus is reset and not to wait for the connection to the Bluetooth devices because many BIOS implementations do not currently support USB plug and play. This means that after an initial scan for connected devices, the BIOS will not recognize subsequently inserted devices. The logical Bluetooth transceiver should also be present at USB reset. This removes any timing dependencies on the operating system loading and provides future support in the event that BIOS implementations do add native Bluetooth support.

Furthermore, connections between the host PC 220 and the Bluetooth wireless (HID) input components (e.g., FIG. 1, 130) can be encrypted when feasible, which implies authentication. Until such time as there is native Bluetooth support in the BIOS, Bluetooth wireless HIDs cannot be used until they are first paired using the operating system's Bluetooth support. During the first pairing and all subsequent shared key changes, the host Bluetooth stack can write the shared key(s) for the HID(s) to the transceiver using a HCI_Write_Stored_Link_Key command. The Bluetooth transceiver (or the dongle) can then store this shared key in non-volatile memory so that the shared key can persist even across machine shutdowns. Alternatively, the dongle can snoop the traffic and pick up the shared key on its own. This allows the dongle to work even when the PC (host) stack does not support this.

The trigger for the handoff from USB HID emulation to native Bluetooth HID is performed when the logical Bluetooth transceiver receives the HCI (Host Controller Interface) Reset command, which indicates to the transceiver that the OS Bluetooth stack has taken over. At this time, several things take place. For example, the Bluetooth stack is loaded by the OS (including HID support) and the OS takes control of the logical communications with the HID device. The SET_IDLE HID command, which is sent inside the Bluetooth HCI data packets to the transceiver, informs the transceiver that the host Bluetooth HID stack is loaded and ready. The SET_IDLE command occurs after the HID connections have been established. Additionally, the Bluetooth HID stack 280 in the local transceiver 210 drops the L2CAP (Logical Link Control and Adaptation Protocol) and physical (baseband) Bluetooth connections to any attached Bluetooth HIDs. Thereafter, the USB hub confirms that it has received the SET_CONFIGURATTION commands for its attached logical USB HIDs and then removes the devices. It should be understood that there may be some added delay during the handoff events to allow plug-and-play (PnP) processes to complete.

It is important to note that on operating system implementations that do not have Bluetooth support but that do have USB HID support, the handoff or relay may not take place. This allows market penetration of Bluetooth wireless HIDs onto platforms that do not natively support Bluetooth provided that the devices are pre-bound to the transceiver.

Additionally, when dropping the connections to the HIDs before transitioning to the host Bluetooth stack support, it is possible that the remote device may not respond promptly to a baseband disconnect request. If the operating system (OS) host stack does not receive a timely response from its reset command, it may assume there is a problem and not use the device. For example, when a second reset is not responded to within a desired timeout period, the host stack can unload. Therefore, the transceiver should set an appropriate timeout value so as to be able to handle the reset command from the host stack.

As in most computing experiences, protecting the integrity of a link between a wireless input device and a PC is a concern. Great amounts of damage are imaginable and possible when allowing a third party to tamper with any data input to the PC. Thus, the link between the host PC 220 and connected devices should be encrypted before the OS is loaded and after initial pairing has taken place. This can be accomplished in part by the transceiver which must store the shared key for the keyboard or any other wireless input device in internal memory. For example, upon initial pairing of the PC with a Bluetooth keyboard, the OS can write the shared key to the transceiver using a Write_Stored_Link_Key command. The shared key can then be rewritten to the transceiver every time the shared key changes. This happens regardless of whether or not the transceiver supports boot-mode since the host does not have visibility into this feature.

At some time or another, a user can decide to "remove" or disconnect the wireless association between the keyboard and the host PC 220. When this is desired, the OS can perform a virtual cable unplug and delete the shared key from the transceiver. If the keyboard is (wirelessly) connected at the time of the virtual unplug (e.g., disconnection of communication between a wirelessly connected device and another device—as opposed to a physical unplugging of the device from another), the keyboard can or should delete its stored shared key as well. The transceiver can optionally delete the stored shared key when this happens, but some commercially available operating systems would not require this deletion.

For security reasons, transceivers should not support the Read_Stored_Link_Key command as this would create a vulnerability or weakness and thus diminish secureness of the wireless connection. If the capabilities bit shows that the transceiver supports the Read_Stored_Link_Key command, then the OS host stack will not write the shared key. Furthermore, the stored shared key in a transceiver can be deleted when or if the device is "removed". However, all stored shared keys in the transceiver can be deleted to mitigate other undesirable usability issues as desired by a user or system. Finally, it should be appreciated that until such time as the BIOS offers native Bluetooth support, the keyboard cannot be used securely with a PC the first time prior to the operating system loading and the keyboard being paired via the operating system.

Since their introduction into the computing world, wireless keyboards and mice have been particularly useful to a variety of users due to the freedom and mobility resulting from a cord-free arrangement. Unfortunately, the wireless existence can be problematic. Typing with a wireless keyboard, for example, can raise various security concerns. For instance, if a third party were able to capture a user's keystrokes by "stealing" data transmissions between the user's keyboard and the host PC, then the user's personal information could be easily tampered with. Thus, establishing and maintaining a secure link or connection with the PC can influence the integrity of the wireless input device to a great extent.

Traditionally, security features, regardless of the specific type, required some form of user input to identify the user. Typing in a username and/or password using a keyboard are common examples of this. Contrary to wired keyboards, there is no plug-in event to acknowledge the existence of a wireless keyboard. That is, there is not an explicit event such as "plugging in" the device to the PC to trigger the PC to recognize the device. Since security is generally enhanced by avoiding the discovery of (wireless) devices including the PC when knowledge of their presence is not necessary, the question remains: How does one make a secure connection between a wireless input device (e.g., HID) and a PC without first recognizing the input device to make the device operational?

In the first generation of wireless input devices, at least one of two approaches was commonly used to overcome the lack of a plug event to trigger recognition. In the first approach, buttons were placed on both the remote device and the transceiver with some order of button pushes initiating and completing pairing. In the second approach, a button on the remote device rendered the device discoverable for a period of time during which the user searched for the device via the PC and, once found, completed pairing.

Unfortunately, both of these approaches are somewhat non-intuitive and confusing to the user and have been highly ineffective in improving the user experience. More importantly, each of these approaches require the presence of a wired keyboard in order to support first connect for a host-side switch, which renders Bluetooth HID devices uninteresting for shipment with new PCs with embedded transceivers.

Figure 3:
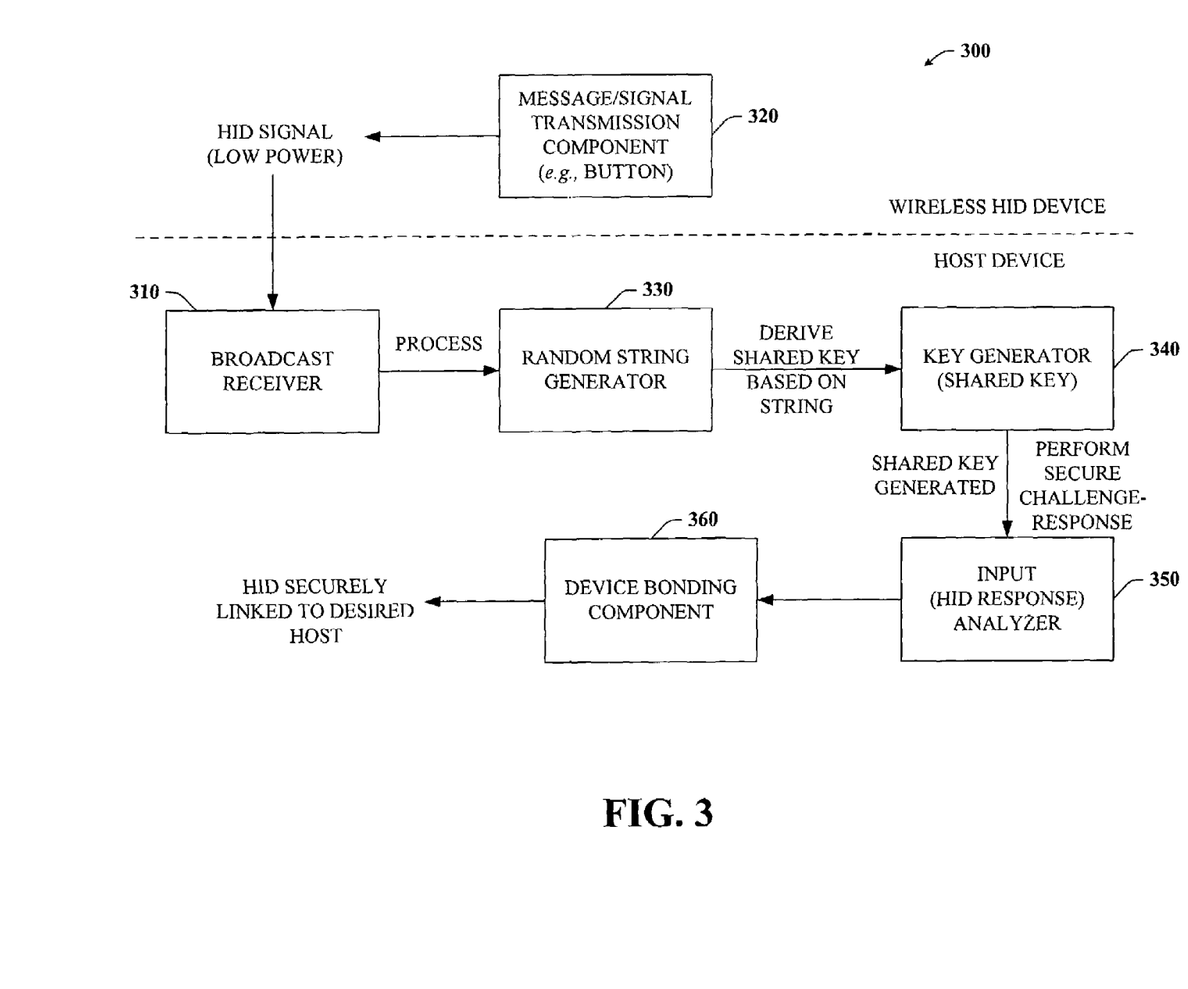
FIG. 3 is a block diagram of a device pairing system that facilitates secure synchronization between devices (e.g., wireless HIDs and PCs) in accordance with an aspect of the subject invention.

To mitigate user confusion and promote ease-of-use while also enhancing security, a device pairing system 300 as represented in FIG. 3 can be employed to facilitate secure wireless connection and communication between a host (e.g., PC) and a wireless HID. The system 300 includes a broadcast receiver 310 that can receive messages and/or any other type of signal communicated or broadcasted from a wireless HID that is attempting to link up to a PC. The message and/or signal can be sent via a message/signal transmission component 320 at a relatively low power to limit communication to PCs located within a particular distance from the device.

The message and/or signal can be processed within the PC to determine that a wireless device may be interested in pairing with the PC. To respond to the broadcasted message or signal, a random string generator 330 can be invoked to generate a random character string comprising number or letters or any combination thereof. This random character string can be considered a password or pass code to facilitate alerting the user that a wireless device may be available for pairing with the PC. If the user deems it to be a desirable pairing, then the user can use the wireless device to type the character string. When the user has completely entered the appropriate string (followed by an "enter" keystroke), the wireless device can again send out a message including a value or shared key generated from or based on the string (via a key generator 340) to find a match to the correct PC for pairing. In particular, a secure challenge-response technique that makes use of the shared key can be employed to challenge each possible host (e.g., PC) in the area.

An input analyzer 350 on the PC can determine whether a match exists with the string captured by the wireless device. Alternatively, the analyzer 350 can be located on the HID such that the HID is tasked with verifying whether the captured keystrokes match to the PC-generated PIN. When a match is made, a device bonding component 360 can form a secure connection between the PC and the wireless HID.

Figure 4:
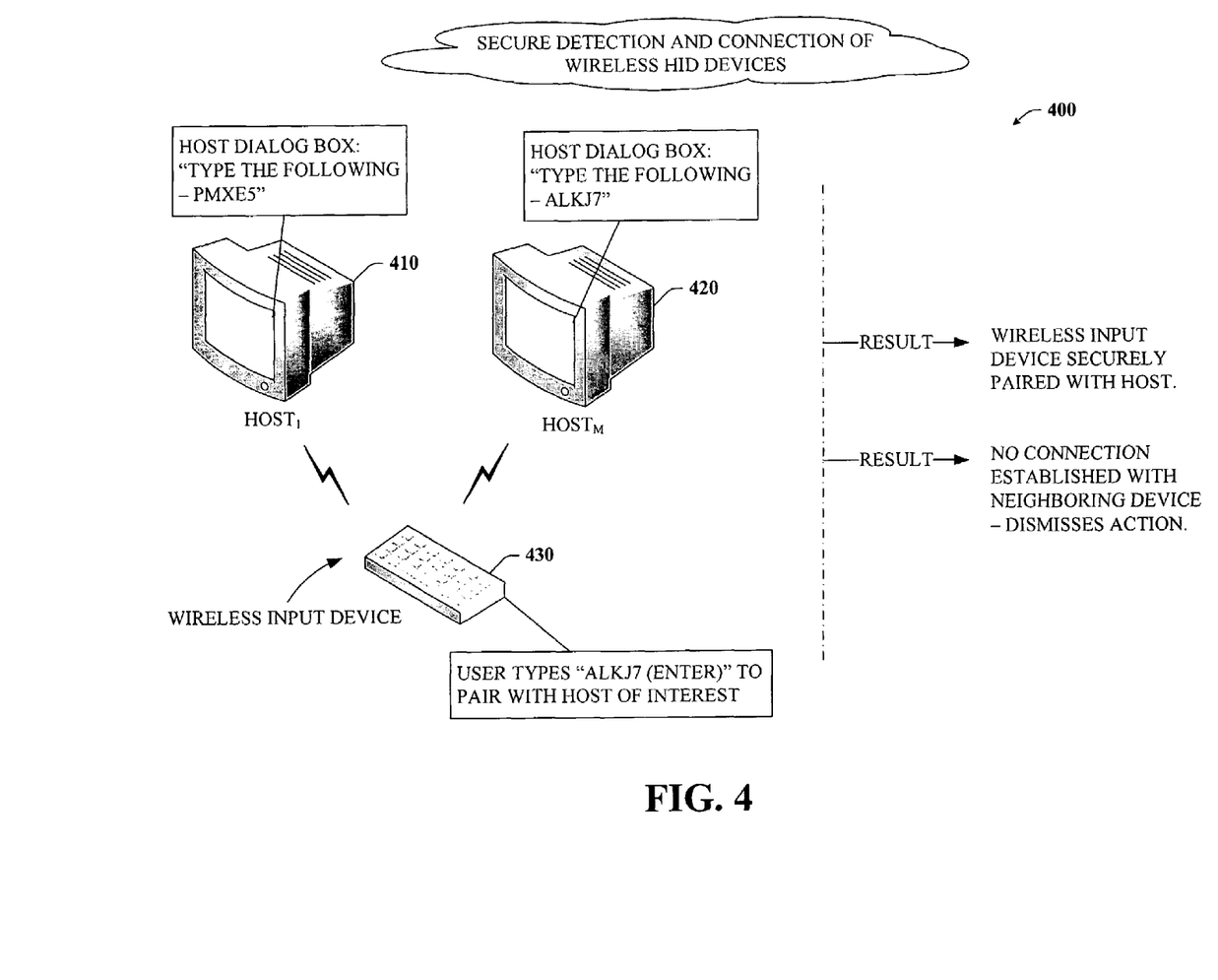
FIG. 4 is a schematic diagram of a computing environment that facilitates secure detection and pairing of wireless input devices to the desired host in accordance with an aspect of the subject invention.

Turning now to FIG. 4, there is illustrated a schematic diagram 400 that can further demonstrate communication between PCs and wireless HIDs that can occur in order to securely link the desirable pair to one another. The diagram 400 includes at least a first $PC_1$ 410 and/or up to an $M^{th}$ PC ($PC_M$) 420, wherein M is an integer greater than or equal to one, as well as a wireless HID 430.

Suppose that a user desires to pair the wireless HID 430 with one of the PCs. The following pairing sequence for keyboard HIDs can be employed. Initially, a button (or other interface) on the keyboard is used to initiate discovery and pairing. This is accomplished by sending a HID-specific broadcast (e.g., a LIAC (limited inquiry access code) specific to HIDs) to hosts (410,420) in the area. The OS host (e.g., PC in the area), upon receiving the broadcast, can respond to the inquiry. However, if the PC (410, 420) is suspended or hibernating, it may in fact ignore it. The PC can also display a dialog telling the user that a HID 430 is trying to attach to the PC. As part of the display, a randomly generated PIN (e.g., PMXE5; ALKJ7) can be displayed which then needs to be typed into the Bluetooth HID 430 (e.g., keyboard) to complete the pairing.

In this case, the keyboard 430 can simultaneously collate responses to the inquiry and capture the user's keystrokes. The user is instructed to enter the PIN shown on their computer screen plus the "enter" key. The "enter" key is necessary so that the keyboard is aware of when the user is done entering the PIN. Once the user has entered the PIN, the keyboard 430 can connect to each of the hosts (410, 420) who responded to the inquiry (LIAC) in succession until it is able to establish a secure link. Since each host is assumed to have a different PIN, only the one displayed on the PC the user is trying to connect to would be successful.

Despite this pairing process, random dialogs on PCs other than the one intended for pairing may still be received. To reduce the likelihood of this happening and to increase security, both the keyboard inquiry and the PC response can be performed at a transmission power level of about −20 dBm, for example, so that only PCs within approximately a desired range can participate in the process. Once the keyboard has been added, additional HIDs can be added in the same manner that other Bluetooth devices are added.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

As described above, the pairing process allows wireless devices and PCs in a region to communicate invisibly to one another to initially establish a level of interest before the devices are displayed to a user. Thus, the devices and the PCs can negotiate whether a particular pairing is of interest; and if one exists, only then is the user notified that a wireless device is available for use. To further illustrate this aspect, FIG. 5 includes a flow diagram of a pairing process 500 in accordance with the subject invention.

Figure 5:
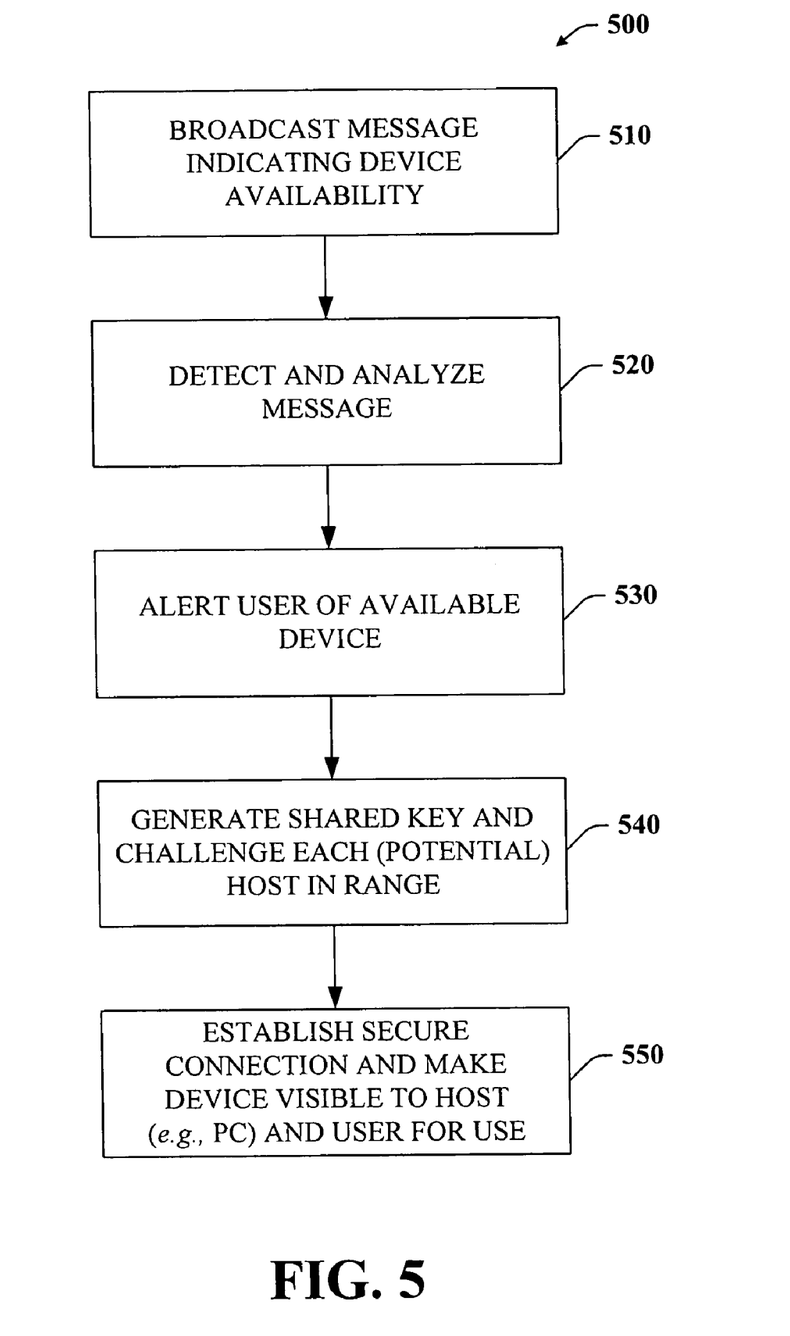
FIG. 5 is a flow chart illustrating an exemplary methodology that facilitates establishing secure connections between potential hosts and Bluetooth enabled devices in accordance with an aspect of the subject invention.

The process 500 involves broadcasting a message that indicates a wireless HID is available to a host PC at 510. This can be accomplished in part by pressing a button on the wireless device. At 520, the message can be detected and analyzed for its content by a PC within an area proximal to the device to avoid picking up too many random messages from devices located physically too far to be interested in pairing with the PC.

At 530, the user can be alerted of the available wireless device by way of a pop-up dialog box on the PC's screen. The dialog box can display a randomly generated code of numbers and/or letters and/or punctuation characters and then ask the user to enter the same code. The device can then capture the user's keystrokes, generate a shared key, and challenge each possible PC located in the designated area at 540. At 550, a secure connection can be established once a match between PC and wireless HID is found. After the PC and the wireless HID are bonded, the device can become visible to the PC as well as to the user for use.

Once the secure connection has been established, the connection can be lost either intentionally or accidentally. One of the potential problems with Bluetooth devices in general, and keyboards in particular, is keeping the devices' connection state synchronized. Whether they get out of synchronization because of user error, memory corruption, or other causes, the result is a frustrating user experience. In either situation, conventional techniques leave the user without an operational wireless device. In some instances, the user can re-pair or re-bond the devices but this is a less than optimal solution.

To begin with, support for changing the shared key needs to be incorporated into Bluetooth devices. By default, the OS can attempt to change the shared key with remote devices on every ensuing connection after pairing. This is done to reduce the likelihood of a brute force attack against the encrypted data sent over the Bluetooth link. If this command is not supported by the keyboard (or any other device) the result can be the loss of shared key synchronization causing the user to have to re-pair with every connection.

Once the PC and the keyboard have been paired at 550, the shared keys can get out of synchronization for several reasons including any one of the following: the user removes the keyboard, thereby erasing the previous shared key; the user removes the device from the OS, thereby removing the pairing; and/or memory corruption on one device or another causes a bad shared key.

To mitigate such occurrences such as in the case where a user, either intentionally or accidentally resets the keyboard, the keyboard can maintain the shared key as well as the host address until it has paired with another device. For example, imagine that the user takes the keyboard to a new PC and pairs with it. Because the keyboard has been paired to a new PC, the previous address is lost and the user continues on with the new PC. However, if the user attempts to type before pairing with another PC and is in the area of the original host PC, the OS can accept the page from the keyboard and start the pairing process (with the original PC).

When a user removes a device from the OS, the system and/or process can assume that the user knows what they want to do. At this point, the OS can send a Delete_Stored_Link_Key down to the transceiver to remove the shared key used during boot. Regardless of the user's action, the result would be the same as above as when the user attempted to use the keyboard before pairing with another device. That is, since the keyboard still has the host's address in its memory, the host would be paged and the OS would start the pairing dialogue even if the user were to reattach the device and begin typing again. In situations when either the host PC or the keyboard has a corrupt shared key, the OS host can prompt the user to authenticate the keyboard again. In all of the above cases, the user is never left with a non-functional keyboard.

Though not shown, a shared key buffer can be employed to store a plurality of shared keys. In some instances, the shared key buffer can fill up or reach capacity and thereby result in either corrupting existing shared keys or causing the addition of new shared keys to be rejected from the buffer. Thus, a command to delete or clear all or substantially all shared keys can be performed or sent (e.g., by the OS) as desired by a user to facilitate maintaining full-use of the user's transceiver.

Figure 6:
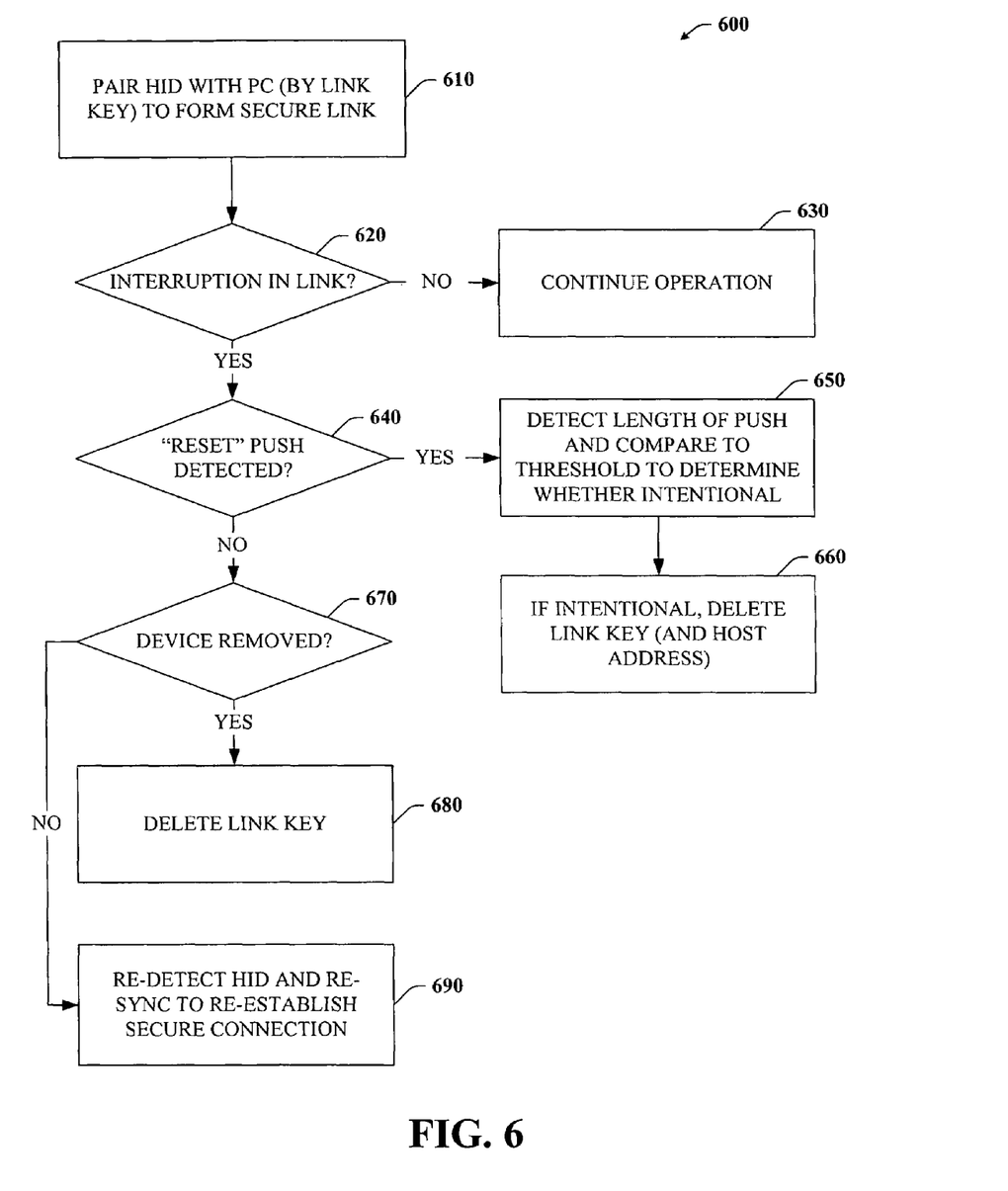
FIG. 6 is a flow chart illustrating an exemplary methodology that facilitates re-establishing secure connections between a host and Bluetooth enabled devices from the HID device perspective in accordance with an aspect of the subject invention.

FIG. 6 depicts one such exemplary method 600 that can be employed when an interruption in the connection has been detected. The method 600 involves a wireless HID being paired with a PC using a shared key at 610. At 620, it can ask whether there has been an interruption in the link or connection. If no, the current operation can continue at 630. However, if an interruption has been detected at 620, then it can be determined whether a "reset" button push (e.g., virtual cable unplug or long make/break connection button press) was performed by the user at 640. If yes, then at 650, the length of the push can be detected and compared to a threshold value to determine whether the reset push was in fact intention. If it was intentional (e.g., push lasted for more than 3 seconds), then the shared key can be deleted at 660.

If the make/break connection button was not pushed, then the host can ask whether the device was removed at 670. If it was, then the shared key used during boot can be removed at 680. Otherwise, the wireless HID can be re-detected and re-synced to reestablish a secure connection at 690.

In order to minimize costs associated with re-establishing wireless connections and maximize usability of a secure wireless connection (e.g., Bluetooth connection), a button or some other alternative interface on the keyboard (or other wireless HID) can respond to being depressed as follows: when the button is depressed for less than 500 ms, ignore. To reduce the opportunity of unintended depression, the button can be recessed within the housing or otherwise protected. In one scenario, a short button press can be defined as a continuous depression of the button from about 500 ms to 3 seconds.

Figure 7:
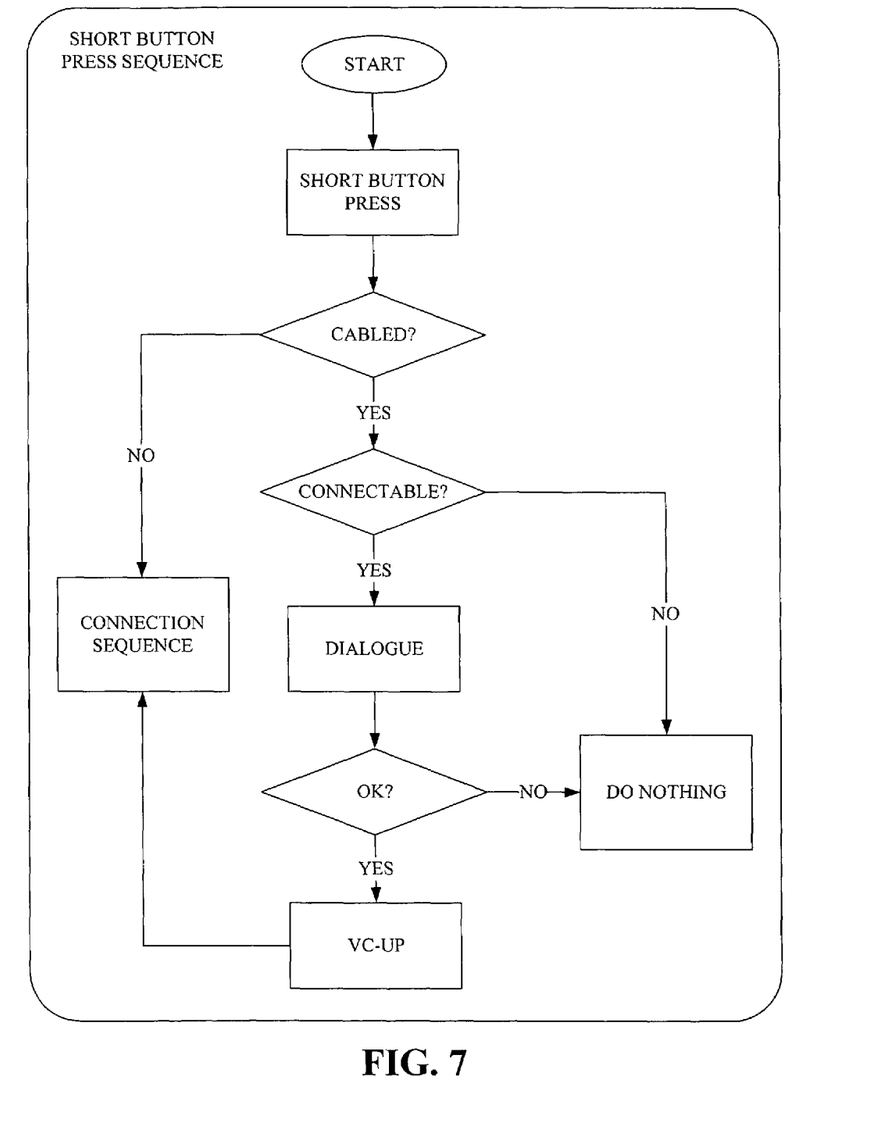
FIG. 7 is a flow chart illustrating an exemplary methodology that facilitates a short button press in accordance with an aspect of the subject invention.

FIG. 7 represents an exemplary short button press sequence. In particular, if a short button push is received and the keyboard does not have an existing virtual cable, then the connect sequence outlined under Keyboard Pairing Process should be initiated. If the device does have an existing virtual cable and the device can connect to the host, then a HID report is generated that indicates a short press/release of a make/break connection button (or some other suitable data input interface). Upon identifying the HID report as such, the host can ask the user (via a dialog) whether he/she desires to unplug or remove the device. If the user indicates "yes", the host can unplug the virtual cable, disconnecting the host from the device. At this point, the device can initiate the keyboard pairing process sequence. If the user rejects the request, then the pairing can remain. Finally, if the device does have an existing virtual cable and the device cannot connect to the host, then the pairing can remain in place.

Figure 8:
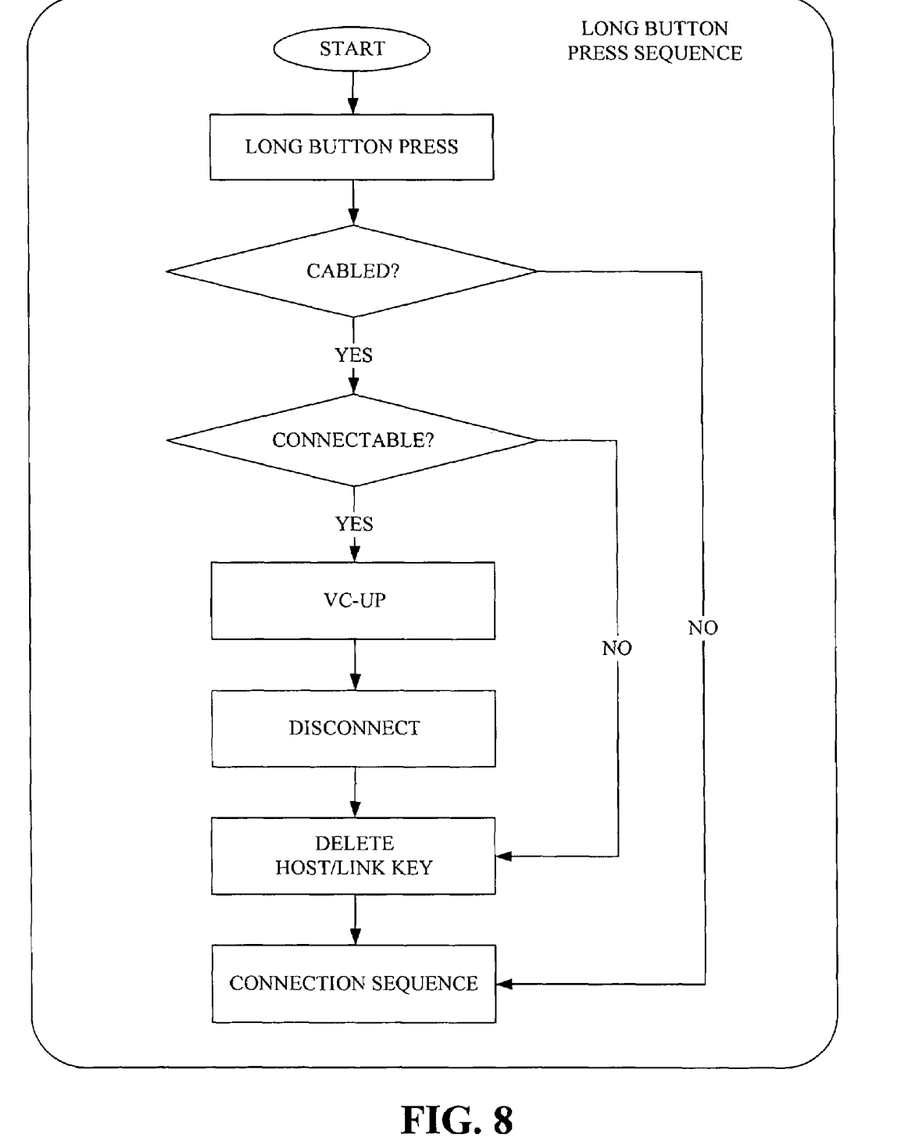
FIG. 8 is a flow chart illustrating an exemplary methodology that facilitates a long button press in accordance with an aspect of the subject invention.

FIG. 8 represents an exemplary long button press sequence. In particular, a button depressed for over ten seconds can be considered a "long button press". Other button press lengths of time may be employed as well to denote a long button press according to user or system preferences. This mode is applicable to circumstances where the user may give their device away and want to remove the shared key. As shown in FIG. 8, an existing host address and shared key can be deleted and the pairing sequence will be initiated.

In general, the device can have some form of feedback mechanism, such as beeps or LEDs, to notify the user of the state of the device corresponding to the button pushes. Having consistency in this usage model between devices can ultimately lead to increased user satisfaction. In some cases, however, certain kinds of feedback mechanisms can adversely affect battery life for HID products. Thus, the user should accommodate for such as necessary.

Figure 9:
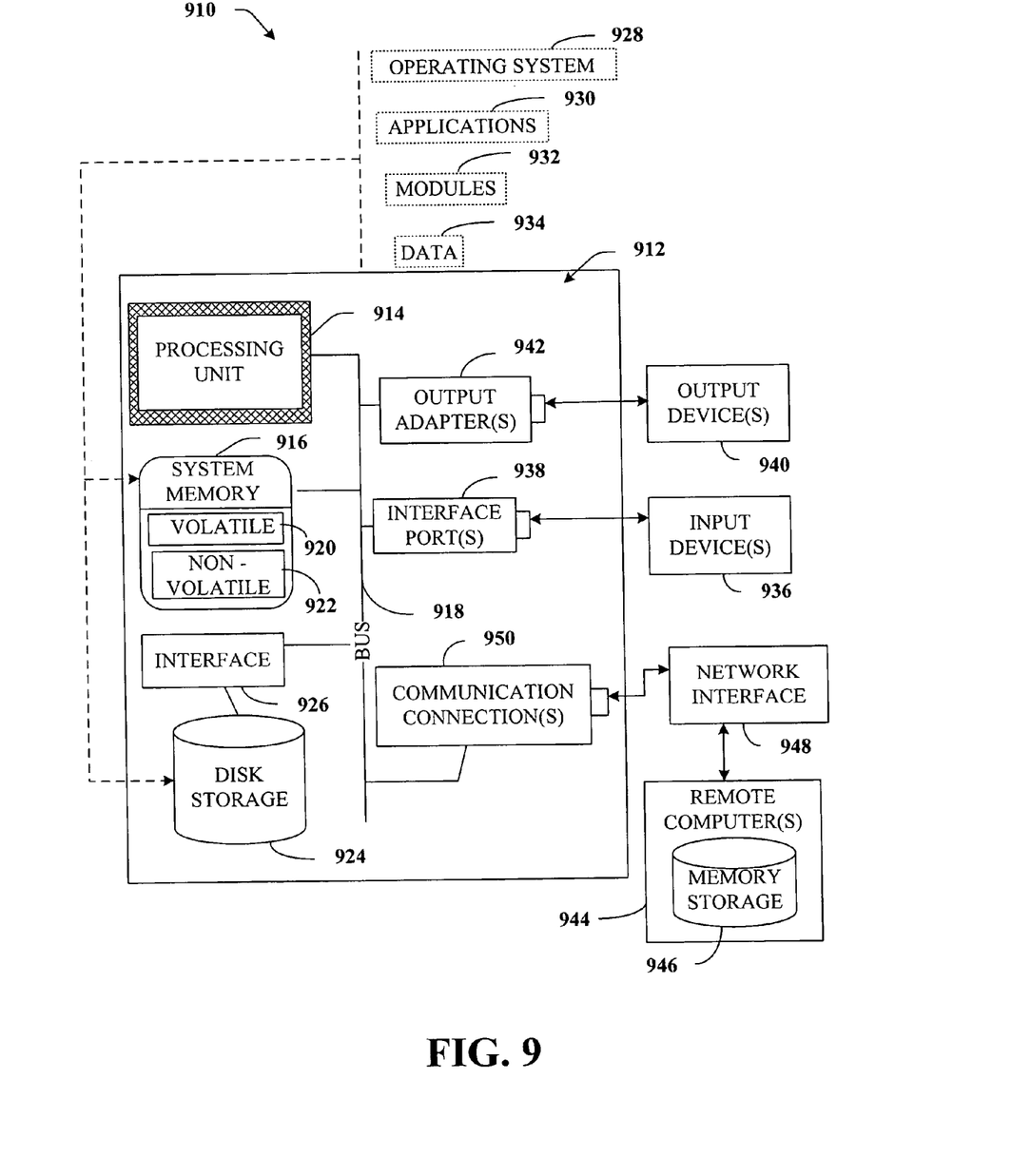
FIG. 9 illustrates an exemplary environment for implementing various aspects of the invention.

In order to provide additional context for various aspects of the subject invention, FIG. 9 and the following discussion are intended to provide a brief, general description of a suitable operating environment 910 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, appliances such as televisions, etc., and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, remote control, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates wireless device support for electronic devices comprising:
   a transceiver—Universal Serial Bus (USB) hub that is configurable to operatively connect to at least one host computer that communicates with at least one wireless input component to facilitate recognizing the at least one wireless input component at boot;
   a pairing component that is configurable to securely connect the at least one wireless input component with the host computer, the pairing component comprising a message transmission component that broadcasts a message from the at least one wireless input component to the host PC to engage the PC into a pairing process;
   a host generator that generates an input sequence selected from a plurality of input sequences and that presents the selected input sequence to a user, asking the user to enter the selected input sequence into the at least one wireless input component to facilitate matching up the at least one wireless input component with a desired PC; and
   an input analyzer comprising a challenge-response mechanism that challenges at least one possible host in the area of the wireless input component, the input analyzer determines whether the response indicates the desired host.

2. The system of claim 1, the pairing component is configurable to further securely bond the at least one host computer to the at least one wireless input component without using another input component.

3. The system of claim 1, the transceiver—Universal Serial Bus (USB) hub comprises a transceiver that is operative as a USB hub having USB—human interface device (HID) emulation to interact seamlessly as one or more USB HIDs with wireless HIDs.

4. The system of claim 3, the transceiver is at least one of a Bluetooth transceiver or any other wireless bus transceiver.

5. The system of claim 1, the message is broadcasted at a low power level to limit a number of PCs that hear the message.

6. The system of claim 1, further comprising a broadcast receiver that receives messages or signals sent by depressing an interface component on the wireless input component.

7. The system of claim 1, further comprising a device bonding component that synchronizes the host PC and at least one wireless input component without requiring input from a separate input device.

8. The system of claim 7, the separate input device comprises at least one of the following: wired or wireless keyboard, wired or wireless mouse, wired or wireless joystick, remote control device, wired or wireless keypad, wired or wireless stylus, or any other wired or wireless device that exposes a human interface device (HID) interface.

9. The system of claim 1, the wireless input component comprises at least one of the following: wired or wireless keyboard, wired or wireless mouse, wired or wireless joystick, remote control device, wired or wireless keypad, wired or wireless stylus, or any other wired or wireless device.

10. The system of claim 1, the transceiver—Universal Serial Bus (USB) hub comprises at least two ports, wherein a USB—human interface device (HID) logical device is connected to a first port and a USB Bluetooth transceiver logical device is connected to a second port.

11. The system of claim 1, the transceiver—Universal Serial Bus (USB) hub comprises a Bluetooth human interface device (HID) stack that allows the transceiver-USB hub to translate a plurality of HID packets from a Bluetooth protocol to a USB protocol.

12. A computer readable medium encoded with a computer program comprising computer executable components of claim 1.

13. A system that facilitates wireless device support for electronic devices comprising:
 a transceiver-USB hub that is configurable to operatively connect to at least one host computer that communicates with at least one wireless input component to facilitate recognizing the at least one wireless input component at boot;
 a pairing component that is configurable to securely connect the at least one wireless input component with the host computer, the pairing component comprising: a message transmission component that broadcasts a message from the at least one wireless input component to the host PC to engage the PC into a pairing process;
 a random string generator that generates a plurality of strings comprising one or more characters and that presents the strings to a user, asking the user to enter the string into the computer to facilitate matching up the wireless input component with a desired PC; and
 an input analyzer comprising a challenge-response mechanism that challenges at least one possible host in the area of the wireless input component, the input analyzer determines whether the response indicates the desired host.

14. A method that facilitates a secure wireless pairing process comprising:
 broadcasting a message to indicate that a wireless input component is in an area and available;
 detecting and analyzing the message;
 notifying a user that the wireless input component is available for connection to a PC by inputting an input sequence selected from a plurality of input sequences on the wireless input component; and
 determining whether a secure connection can be established between the PC and the wireless input component in response to receiving the selected input sequence.

15. The method of claim 14, the message comprises one or more signals that are transmitted to and received by one or more PCs located within a distance from the wireless input component.

16. The method of claim 14, further comprising depressing a data input interface component located on the wireless device to initiate a message broadcast from the wireless input component, wherein the data input interface component comprises at least one of the following: a button, a switch, a knob, and a key.

17. The method of claim 14, the message is a limited inquiry access code specific to wireless input components and to ' in the area.

18. The method of claim 14, the message is transmitted at a transmit level low enough to mitigate displaying random dialogs on PCs other than on the PC intended for pairing while enhancing security.

19. The method of claim 14, further comprising making the wireless input component visible to the PC after the secure connection is established.

20. The method of claim 14, the wireless input component is a wireless human interface device (HID).

21. The method of claim 14, the wireless input component is at least one of the following: a keyboard, a mouse, a joystick, a stylus, and a helmet.

22. A method that facilitates a secure wireless pairing process comprising:
 broadcasting a message to indicate that a wireless input component is in an area and available;
 detecting and analyzing the message;
 notifying a user that the wireless input component is available for connection to a PC comprises:
  generating a random character string,
  making the random character string visible on the PC while keeping the wireless input component invisible to the PC, and
  requiring the user to respond to the message by entering the random character string using the wireless input component; and
 determining whether a secure connection can be established between the PC and the wireless input component.

23. The method of claim 22, determining whether a secure connection can be established comprises:
 collating responses to the message and capturing keystrokes from the wireless input component simultaneously;
 matching the user's response to the random character string generated by the PC; and
 when a match occurs, establishing a secure connection between the wireless input component and the PC.

24. A method that facilitates a secure wireless pairing process comprising:
 broadcasting a message to indicate that a wireless input component is in an area and available;
 detecting and analyzing the message;
 notifying a user that the wireless input component is available for connection to a PC;
 determining whether a secure connection can be established between the PC and the wireless input component; and
 detecting a reset push from the wireless input component; and determining whether the user desires to delete a pairing between the wireless input component and the PC.

25. The method of claim 24, determining whether the user desires to delete the pairing comprises:
 detecting a length of the reset push; and
 comparing the length of the reset to push to a threshold to ascertain whether the reset push was intentional or accidental.

26. The method of claim 24, further comprising performing one of the following:
 deleting a shared key used for or by the wireless device when the push is intentional; and
 re-synchronizing the secure connection when the push is accidental.

27. The method of claim 24, wherein an intentional reset push is of a greater length than an accidental push.

28. A system that facilitates a secure wireless pairing process comprising:
- means for broadcasting a message to indicate that a wireless input component is in an area and available;
- means for detecting and analyzing the message;
- means for notifying a user that the wireless input component is available for connection to a PC by inputting a unique input sequence; and
- means for determining whether a secure connection can be established between the PC and the wireless input component in response to receiving the unique input sequence from wireless input component made by the user, a computer readable medium encoded with a computer program comprising computer executable components for facilitating a secure connection between a host and at least one wireless input device comprising.

29. A computer readable medium encoded with a computer program comprising computer executable components for facilitating a secure connection between a host and at least one wireless input device, comprising:
- a first set of codes for causing a computer to access information associated with a message broadcasted from the wireless input device to at least one possible host in an area that indicates that the wireless input component is available for use;
- a second set of codes for causing the computer to generate a shared key to challenge each possible host, at least one possible host responding with an input sequence selected from a plurality of input sequences, and with a response from the user comprising the selected input sequence that indicates which host is the desired host.

* * * * *